United States Patent [19]

Miller et al.

[11] 4,291,617

[45] Sep. 29, 1981

[54] PRESSURIZED INJECTION STEAMER

[75] Inventors: Dye O. Miller, South Barrington; August J. Antunes, Elmhurst; Jerome Antunes, Clarendon Hills, all of Ill.

[73] Assignee: A. J. Antunes & Co., Addison, Ill.

[21] Appl. No.: 70,484

[22] Filed: Aug. 28, 1979

Related U.S. Application Data

[63] Continuation-in-part of Ser. No. 899,164, Apr. 24, 1978.

[51] Int. Cl.$^3$ .................. A23L 3/16; A47J 27/04
[52] U.S. Cl. ........................... 99/483; 99/516; 99/532; 126/369; 219/401; 220/301
[58] Field of Search .............. 99/419, 467, 483, 516, 99/532, 533; 126/348, 369, 374, 377, 379; 219/401; 138/DIG. 3, 118, 119; 165/133, 134; 220/298, 300–302; 137/15

[56] References Cited

U.S. PATENT DOCUMENTS

| | | | |
|---|---|---|---|
| Re. 28,292 | 1/1975 | Piper et al. | 99/483 |
| 2,513,458 | 7/1950 | Dion | 220/301 |
| 2,617,349 | 11/1952 | Tucker | 99/483 |
| 2,620,789 | 12/1952 | Gregory | 126/379 |
| 2,674,935 | 4/1954 | Lewis et al. | 126/369 |
| 2,718,842 | 9/1955 | Klemm | 126/369 |
| 2,747,224 | 5/1956 | Koch et al. | 138/DIG. 3 |
| 2,932,065 | 4/1960 | Jenkins | 138/DIG. 3 |
| 2,980,099 | 4/1961 | Klemm | 99/483 |
| 3,078,783 | 2/1963 | Lee, Sr. | 126/369 |
| 3,313,314 | 4/1967 | Burke et al. | 138/118 |
| 3,604,895 | 9/1971 | MacKay | 219/401 |
| 3,624,800 | 9/1971 | Swick | 138/118 |
| 3,869,815 | 3/1975 | Bullock | 219/401 |
| 3,889,582 | 6/1975 | Binks et al. | 99/516 |
| 4,162,741 | 7/1979 | Walker et al. | 220/298 |

Primary Examiner—Harvey C. Hornsby
Assistant Examiner—Timothy F. Simone
Attorney, Agent, or Firm—Mason, Kolehmainen, Rathburn & Wyss

[57] ABSTRACT

A pressurized injection steamer for heating food items such as pastries, rolls or the like to render them appetizing both in appearance and taste. The steamer includes a pressurized steam generating chamber below a food supporting surface. The food supporting surface includes a plurality of upstanding, hollow injector needles having one or more steam outlet holes adjacent the upper end upon which the food items to be steam heated are impaled. A generally horizontal, non-heat conducting elongated tube enters the steam chamber through one of the side walls for spraying tap water through side orifices into the steam chamber and the water falls onto a subjacent heated platen for immediate vaporization. An apertured baffle plate above the water inlet tube prevents non-vaporized liquid from entering the open bottoms of the hollow needles. The elongated tube is further insulated to prevent heating of the incoming water through the walls of the steam generating chamber. The cover plate is releasably secured to the top of the steam generating chamber by cam locking or other means. A safety interlock prevents the introduction of water into the steam chamber prior to secure locking of the cover plate.

2 Claims, 5 Drawing Figures

PRESSURIZED INJECTION STEAMER

CROSS REFERENCE TO PENDING APPLICATIONS

This application is a continuation-in-part of Application Ser. No. 899,164 filed Apr. 24, 1978 and assigned to the assignee of the present invention.

BACKGROUND OF THE INVENTION

1. Field of the Invention

This invention relates to devices for steam heating of food items and in particular, to a pressurized steamer for injecting dry steam directly into the food items.

2. Brief Description of the Prior Art

Similar devices of this type have been known and are used for the steam heating of foods by treating the foods with internally injected steam. Most of these devices require the use of distilled water to prevent lime and other sediments from clogging the minute orifices within the device. Since precooked foods tend to lose much of their natural juices and moisture, steam heating provides a natural advantage in restoring moisture to the foods while they are reheated. This restoration of moisture assists in the restoring of the natural appetizing, appearance, texture of the foods.

A major problem with prior steam cooking devices, however, is that the orifices in the heated platen or elsewhere become clogged by solid particles or impurities which remain in the nozzles or hollow pins when the water is vaporized. The most common problem with impurities is that lime, which is present in almost every urban system, remains in the orifice after vaporization of the water and the orifices therefore require periodic cleaning. The cleaning process usually involves a complicated and time consuming dismanteling of the device to reach the clogged orifices and and then scraping or drilling the orifices open. In some cases, used parts must be discarded since they cannot be cleaned.

SUMMARY OF THE INVENTION

The object of the present invention is to provide a steam heating apparatus whereby the orifices can be maintained in a clean, operable condition for a substantially longer period of time by causing the steam generation and vaporization to take place in a lower steam chamber.

Another object of the present invention is to provide a simple and easily disassembled construction so that impurities which are collected in a predesigned area can be easily removed.

Another object of the present invention is to provide a pressurized injection steamer which operates on conventional tap water.

This and other objects of the invention are achieved by the provision of a pressurized food steamer for heating food items such as pastries, rolls or the like to render them appetizing both in appearance and taste. The steamer includes a pressurized steam generating chamber below a food supporting surface. The food supporting surface includes a plurality of upstanding, hollow injector needles having one or more steam outlet holes adjacent the upper end upon which the food items to be steam heated are impaled. A generally horizontal, non-heat conducting elongated tube enters the steam chamber through one of the side walls for spraying tap water through side orifices into the steam chamber and the water falls onto a subjacent heated platen for immediate vaporization. An apertured baffle plate above the water inlet tube prevents non-vaporized liquid from entering the open bottoms of the hollow needles. The elongated tube is further insulated to prevent heating of the incoming water through the walls of the steam generating chamber. The cover plate is releasably secured to the top of the steam generating chamber by cam locking or other means. A safety interlock prevents the introduction of water into the steam chamber prior to secure locking of the cover plate.

Other objects, features and advantages of the invention will be apparent from the following detailed description taken in connection with the accompanying drawings.

BRIEF DESCRIPTION OF THE DRAWINGS

The invention, both as to its organization and method of operation, together with further objects and advantages thereof, will best be understood by reference to the following specification, taken in connection with the accompanying drawings in which.

DESCRIPTION OF THE PREFERRED EMBODIMENT

Figure 1:
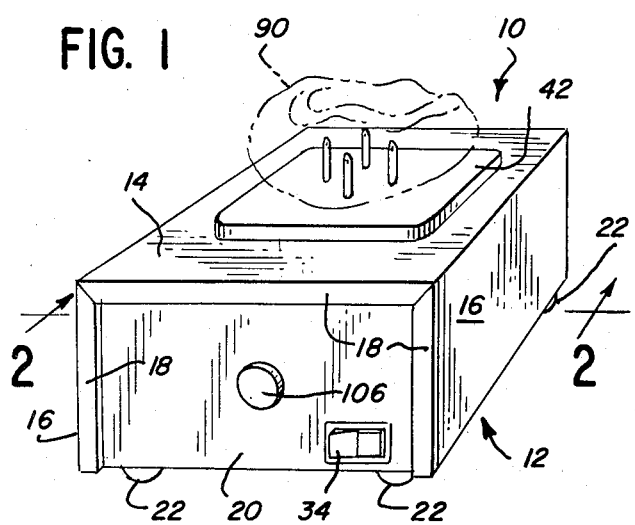
FIG. 1 is a perspective view of a pressurized injection steamer made in accordance with the concepts of the present invention.

A pressurized injection steamer made in accordance with the concepts of the present invention is shown in FIG. 1 and generally designated by the reference numeral 10. The steamer 10 includes, in the embodiment shown, a rectangular housing 12 having a unitary U-shaped cover including a top 14 and two side walls 16. The front and rear of the side walls and the top 16 include inwardly directed flanges 18 which enclose or encapsulate the base 20. The base 20 is supported by a plurality of feet such as 22 on a suitable supporting surface.

Figure 2:
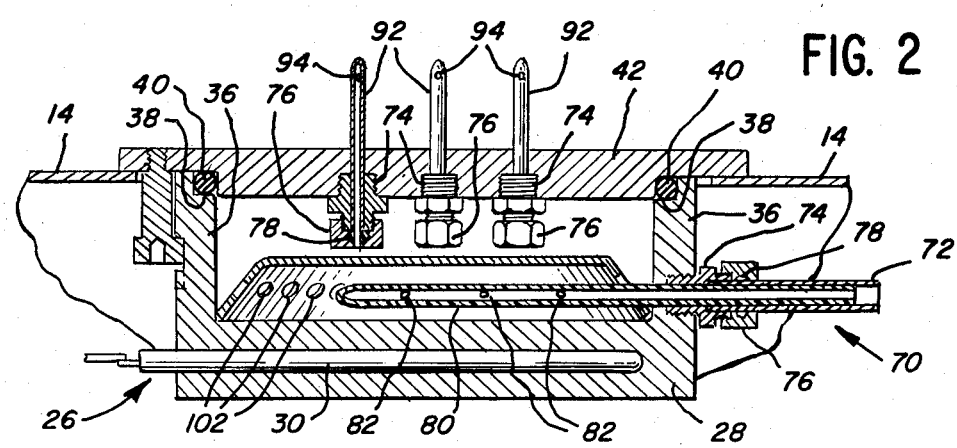
FIG. 2 is a vertical section taken along line 2—2 of FIG. 1.
Figures 3, 4:
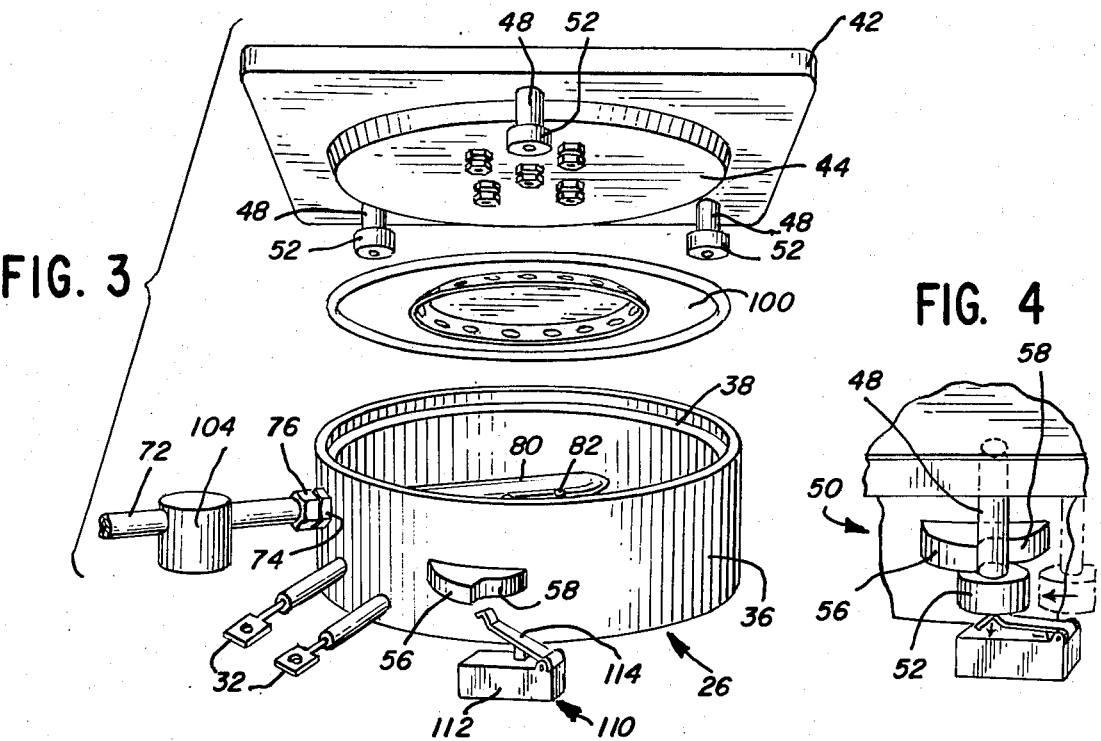
FIG. 3 is a partially fragmented, exploded view of the steam chamber and cover plate of the steamer of FIG. 1.
FIG. 4 is a fragmented perspective view of one type of locking means for securing the cover plate to the chamber.

The base 20 is similarly manufactured of sheet metal or other material providing the housing for a steam chamber 26 shown in FIG. 2. The steam chamber 26 may be rectangularly or circular as shown in FIG. 3, and is preferably a unitary casting made of a material, such as aluminum, having a high heat transfer coefficient. As can be seen in the cross-sectional view of FIG. 2, the casting has a substantially thick base portion 28 into which a heating element 30 such as calrods or the like are inserted. The ends of the calrods include terminals 32 for connection to a suitable power supply. The power supply is applied through an off-on switch 34 (FIG. 1) and a thermostat (not shown) which maintains the base portion 28 at a suitable temperature for quickly vaporizing water injected into the steam chamber as will be described in detail hereinafter. The upper cylindrical walls 36 of the steam chamber are provided with an inner shoulder 38 at the uppermost end and an O-ring 40 is provided to seal the chamber with a top cover or manifold plate 42. As shown in FIG. 3, the manifold plate 42 has a downwardly directed circular boss 44 which fits snugly against the O-ring 40 to sealingly mount the manifold plate 42 on the top of the steam generating chamber 26. The upper portion of the manifold plate 42 is shown in the preferred embodiment as generally square or rectangular in shape and fits snugly against the upper surface 14 of the housing. A square or rectangular hole in the housing is completely sealed by the cover plate 42.

The design of the present invention permits the use of conventional tap water, containing all of its impurities, to be used without creating undue maintenance problems. In particular, the design of the present invention provides an easy disassembly and access to the interior of the steam chamber. In particular, a plurality of shoulder bolts 48, three as shown in the preferred embodiment, are threaded into appropriate in manifold plate and extend downwardly as shown in FIG. 3. A bayonet cam type locking means, generally designated 50 (FIGS. 4 and 5) is provided to secure the manifold plate to the steam generating chamber and permits its removal without the use of any tools.

In particular, each of the shoulder bolts include an enlarged head portion 52 at its lowermost end. In the cam locking means of FIG. 4, a plurality of laterally extending bosses 56 are integrally molded or otherwise provided on the side walls 36 on the steam generating chamber. Each of the bosses include an indented or curved leading edge portion 58, all of which are directed in the same clockwise or counterclockwise direction as may be selected. The manifold plate 42 is then securely fastened to the top of the steam generating chamber 26 by lowering the same downwardly while in an angular orientation so that the edge 52 of the shoulder bolts 48 clear the bosses 56. Once the manifold plate 42 is against the upper surface of the side walls, a simple manual rotation of the manifold plate causes the heads of the shoulder bolts 48 to lock below the curved surface of the leading edges 58 and securely fasten the manifold plate to the steam generating chamber. The O-ring 40 facilitates forming a hermetic seal on the interior of the steam generating chamber.

Figure 5:
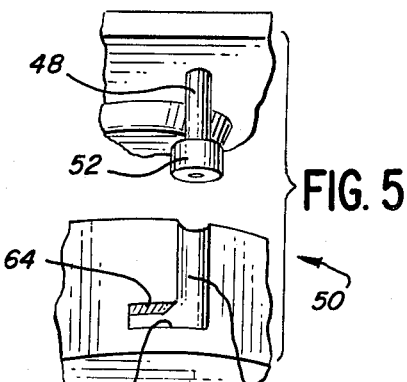
FIG. 5 is an alternative cam locking assembly contemplated by the present invention.

In an alternative embodiment, shown in FIG. 5, the cam locking means includes a similar bolt which is mounted closer to the center of the manifold plate described above with respect to FIG. 4. In this embodiment, a vertical slot 60 is aligned with the head 52 of the bolt and the manifold is then moved downwardly into engagement with the upper ends of the walls 36. Each of the slots (three in this embodiment) includes an L-shaped or lateral slot portion 62 so that the manifold plate 42 can be then rotated, any number of degrees depending upon the length of lateral slot 62, to securely lock the manifold plates on top of the steam generating chamber 26. If additional locking force or additional compression of the O-ring 40 is desirable, the upper surface 64 of the lateral slot 62 and the lower surfaces of the bosses 56 may be slanted or inclined downwardly so that continued rotation of the manifold relative to the chamber causes additional locking pressure. This bayonet type mount insures an excellent seal between the two elements. The inclined surface 64 can be useful as the heads of the bolts wear or other parts of the unit wear with continued and repetitive disassembly and reassembly. Alternatively, the shoulder bolt 48 could be adjustable and tightened with a tool, such as an Allen wrench after each assembly to alleviate any problems of wear or other causes.

Referring again to FIG. 2, the steam generating chamber 26 includes a water supply inlet generally designated 70 to provide water to its interior to be vaporized and to create steam. In the particular embodiment shown, the water inlet 70 is through an aperture of the side wall 36 of the steam generating chamber. A metal supply line 72 is connected to a typical fitting 74 secured in the aperture by a lock nut 76 and compression ring 78. However, to prevent or reduce buildup of sediment and to permit easy removal of sediment from the inlet tube, an inlet tube 80 is provided which is made of a low thermal conductive material such as that sold under the trade name Teflon. This inlet tube 80 is closed at one end and has an outer diameter substantially equal to the inner diameter of the supply tube 72 so that it can be inserted for a substantial distance into the water supply tube as shown in FIG. 2. The inlet tube 80 is provided with a plurality of spray holes 82 along its length, and at the lateral or midpoints of the side walls of the tube so that a small amount of water is retained within the spray tube to keep the spray tube below the boiling temperature of water. A crimp or other means (not shown) on the end of the spray tube may be used to facilitate proper horizontal alignment of the spray apertures 82. Thus, water is introduced and sprayed onto the lower surface 28 of the housing for vaporization.

To provide injection of the steam directly into a food particle 90 as shown in FIG. 1, a plurality of injector needles or pins 92 are provided. Each of the injector pins 92 is hollow and inlcudes one or more steam outlet holes 94 adjacent their uppermost or pointed end. The needles are secured within appropriate apertures by similar fittings 74 secured by threaded apertures in the bottom of the manifold plate 42. The pins are secured to the fittings by similar nuts 76 and compression rings 78. Thus, the steam that is generated will pass through the only exit from the pressurized chamber, the hollow center of the pins, out the injection apertures 94 and into the food product. While the embodiment as shown includes five injection needles, any suitable number are contemplated by the present invention.

A diffuser plate 100 is provided to prevent boiling or bubbling liquid water from entering the injection needles and the food product. The diffuser plate 100 is essentially an inverted dish-shaped metal plate which includes a plurality of apertures 102 around the peripheral, slanted edge. No apertures are provided within the horizontal portion to insure that dry super heated, pressurized steam is provided to the apertures at the base of each of the needles 92.

In operation, a solenoid valve 104 is provided in the water inlet tubes 72 and energized by a steam button 106 which is depressed to allow a predetermined amount of pressurized water to be sprayed onto the heated bottom or platen 28 of the chamber 26. Alternatively, a specific type solenoid which provides a predetermined shot of water may be utilized when a supply of pressurized water is not easily available. In either case, the solenoid is energized to inject the water by depressing the steam button 106.

Since the present invention provides for highly pressurized steam to be generated, a safety interlock mechanism, generally designated 110 is provided to prevent steam generation when the manifold is not securely locked to the top of the steam generating chamber 26.

In particular, the interlocking means 110 includes a microswitch or other switch means having a leaf-type feeler 114 pivoted thereto. The switch 112 is mounted below the locking means so that the feeler 114 must be engaged by the head 52 of one of the shoulder bolts 48 in its locked position for the switch 112 to be made. Referring, for example, to FIG. 4, when the manifold plate is secured to the top of the steam generating chamber 26 and rotated to its locked position, the head 52 of one of the bolts 48 depresses the feeler 114 downwardly to "make" the switch. When the switch is made, the solenoid 104 is operative and responds to depressing the button 106. However, the electrical connection (not shown) between the switch 112 and solenoid 104 prevents operation of the solenoid 104 irrespective of the manual actuation of the button 106, to prevent generating pressurized steam when the manifold is not in its locked position. This safety interlock is an important feature of the disclosed device since damage or injury could occur should steam be generated if the manifold is not securely locked to the steam generating chamber when water is introduced onto the hot platen.

Other modifications, such as the shape and size of the steam chamber, the predetermined or adjustable "shot" of water, the number of injection needles or other modifications will be obvious to those skilled in the art. Similarly, the bayonet mount of the present invention could easily be modified to provide, for example, a breech lock mount, a hinge mounting or other variations. Therefore, the foregoing detailed description of the preferred embodiment illustrated in the drawings has been given for clearness of understanding only and no unnecessary limitations should be understood therefrom as some modifications will be obvious to those skilled in the art.

We claim:

1. An injection steamer for heating food items or the like, comprising:

a steam generating chamber comprising a lower housing portion and an upper cover plate;

means for heating an area of said steam generating chamber;

water inlet means mounted in a steam chamber above the heated area for introducing water from a source thereof, said water inlet being manufactured of a material having a low heat transfer coefficient;

means for removably mounting the upper cover plate to said steam generating chamber lower housing portion;

a plurality of injector needles mounted in fluid communication with said steam chamber for supplying said pressurized steam to the interior of a food item, a baffle plate mounted between said water inlet means and said injection needles, said means for removably mounting said cover plate to the steam generating housing lower portion comprises a bayonet mount wherein said bayonet mount is operable by relative rotation of said cover plate to said lower housing portion, and interlock means to prevent steam generation when said cover plate is not securely locked to the lower housing portion, said interlock comprises cam actuated switch means connected to said water inlet tube to prevent the introduction of water into said steam chamber, said switch means actuated by rotation of said cover plate relative to said lower housing portion wherein said switch means is mounted below said bayonet mount to be actuated by engagement thereof upon complete securement of said cover plate to said lower housing portion to permit steam generation.

2. An injection steamer for heating food items or the like, comprising:

a housing defining a steam generating chamber, said housing having a lower housing portion and an upper cover plate;

means for heating an area of said steam generating chamber;

water inlet means mounted in the steam chamber above the heated area for introducing water from a source thereof, said water inlet means being manufactured of a flexible material having a low heat transfer coefficient and including water outlet means in the sides thereof for spraying water onto said steam generating chamber while retaining a portion of said water in liquid form within the water inlet means;

bayonet mounting means for removably mounting the upper cover plate to the lower housing portion;

safety interlock means to prevent steam generation when said cover plate is not securely locked to said lower housing portion; and a plurality of injector needles in fluid communication with said steam chamber for supplying said pressurized steam to the interior of a food item, said safety interlock comprises a cam actuated switch means connected to said water inlet means to prevent introduction of water into said steam chamber, said cam actuated switch means being mounted in the position to be engaged by said bayonet mounting means and to permit steam generation only when said upper cover is securely mounted to the lower housing portion of said steam generating chamber.

* * * * *